(12) United States Patent
Van Lammeren (10) Patent No.: US 9,356,467 B2
(45) Date of Patent: May 31, 2016

(54) CHARGE BALANCING CIRCUIT FOR SERIES CONNECTED CHAINS OF CHARGE STORAGE ELEMENTS

(75) Inventor: Johannes Petrus Maria Van Lammeren, Beuningen (NL)

(73) Assignee: DATANG NXP SEMICONDUCTORS CO., LTD., Jiangsu (CN)

( * ) Notice: Subject to any disclaimer, the term of this patent is extended or adjusted under 35 U.S.C. 154(b) by 533 days.

(21) Appl. No.: 13/034,985

(22) Filed: Feb. 25, 2011

(65) Prior Publication Data

US 2011/0215760 A1 Sep. 8, 2011

(30) Foreign Application Priority Data

Mar. 4, 2010 (EP) ..................................... 10155538

(51) Int. Cl.
*H02J 7/34* (2006.01)
*H02J 7/00* (2006.01)

(52) U.S. Cl.
CPC ................. *H02J 7/34* (2013.01); *H02J 7/0014* (2013.01); *H02J 7/0024* (2013.01); *H02J 7/0016* (2013.01)

(58) Field of Classification Search
CPC ............................... H02J 7/0016; H02J 7/0014
USPC .............................. 320/116, 118; 13/116, 118
See application file for complete search history.

(56) References Cited

U.S. PATENT DOCUMENTS

| | | | |
|---|---|---|---|
| 5,710,504 A * | 1/1998 | Pascual et al. | 180/65.8 |
| 5,932,932 A * | 8/1999 | Agatsuma et al. | 307/10.6 |
| 6,642,692 B2 * | 11/2003 | Kinoshita | 320/112 |
| 7,598,706 B2 | 10/2009 | Koski et al. | |
| 2001/0054877 A1 | 12/2001 | Kinoshita | |
| 2008/0180061 A1 | 7/2008 | Koski et al. | |
| 2010/0164430 A1 * | 7/2010 | Lu et al. | 320/103 |

FOREIGN PATENT DOCUMENTS

| | | |
|---|---|---|
| CN | 101051754 A | 10/2007 |
| WO | 2009/155986 A1 | 12/2009 |

OTHER PUBLICATIONS

Kultgen M. "Managing High-Voltage Lithium-Ion Batteries in HEVs.," EDN, EDN, pp. 45-52, (Apr. 9, 2009).
Extended European Search Report for European Patent Application No. 10155538.1 (Aug. 27, 2010).

* cited by examiner

*Primary Examiner* — Yalkew Fantu
*Assistant Examiner* — Manuel Hernandez
(74) *Attorney, Agent, or Firm* — Foley & Lardner LLP; James F. Ewing; Paul M. H. Pua (57) ABSTRACT

There is disclosed a charge balancing circuit (CBC) and method (10, 20) for balancing charge storage elements (CSE1_1, CSE1_2, CSE2_2) of a charge storage device (CSD). The charge storage device comprises at least two series connected chains (CHN1, CHN2) of charge storage elements. The charge balancing circuit (CBC) connects a first charge storage element (CSE1_1) of a first chain (CHN1) in parallel with a first charge storage element (CSE1_2) of a second chain (CHN2) during a first period of time ($\phi 1$), and connects the first charge storage element (CSE1_1) of the first chain (CHN1) in parallel with a second charge storage element (CSE2_2) of the second chain (CHN2) during a second period of time ($\phi 2$).

19 Claims, 6 Drawing Sheets

CHARGE BALANCING CIRCUIT FOR SERIES CONNECTED CHAINS OF CHARGE STORAGE ELEMENTS

CROSS-REFERENCE TO RELATED APPLICATIONS

This application claims the priority under 35 U.S.C. §119 European patent application no. 10155538.1, filed on Mar. 4, 2010, the contents of which are incorporated by reference herein.

The present invention relates to a balancing circuit for charge storage elements, such as battery cells or capacitors.

Charge storage elements are commonly linked together to form larger charge storage devices, such as a battery pack comprising multiple series connected batteries, or a capacitor bank comprising multiple series connected capacitors.

Ideally, all the charge storage elements of a charge storage device should all have the same state of charge as one another, for example if a charge storage device is 60% charged, then each of the charge storage elements within it should also be 60% charged. However, repeated charge and discharge cycles of a charge storage device can cause small mismatches between the elements of the device to progressively result in larger and larger differences between the state of charge of the various elements. For example, if one of the elements is slightly less efficient than the other elements at storing charge during charging, then the state of charge of that element will become progressively lower and lower compared to the state of charge of the other elements for each charge/discharge cycle that takes place. Conversely, if one of the elements is slightly more efficient than the other elements at storing charge during charging, then the state of charge of that element will become progressively higher and higher compared to the state of charge of the other elements for each charge/discharge cycle that takes place.

This progressive decrease/increase of the state of charge of one charge storage element compared to the other charge storage elements of a charge storage device, can reduce the amount of energy that can be stored in the charge storage device. Additionally, in some cases it can result in the over-discharging or the over-charging of a charge storage element, causing damage to the charge storage element.

Known techniques for balancing the state of charge of charge storage elements often incorporate reactive circuit components. However, these generally operate at high switching frequencies to minimize the component sizes, and so often result in high switching losses.

U.S. 2008/0180061 discloses a circuit for switching a chain of series connected battery cells into parallel to perform charge balancing. Once the cells are switched into parallel, they are all forced to the same voltage potential, and so charge transfer can take place between them until they reach a similar state of charge to one another. Battery cells adjacent to one another have switches between them that are used to either connect the cells in series, or to connect them in parallel. However, the resistance of the switches between each series connected cell can result in switch losses, reducing the efficiency of the battery pack, and lowering its effective output capacity.

It is therefore an aim of the invention to provide an improved circuit for reducing the accumulation of differences in the states of charge of the various charge storage elements of a charge storage device.

According to an embodiment of the invention, there is provided a charge balancing circuit for balancing charge storage elements of a charge storage device, the charge storage device comprising at least two series connected chains of charge storage elements, wherein the charge balancing circuit comprises switches and corresponding switch control circuitry arranged to connect:
  a first charge storage element of a first chain in parallel with a first charge storage element of a second chain during a first period of time; and
  the first charge storage element of the first chain in parallel with a second charge storage element of the second chain during a second period of time.

Connecting two charge storage elements in parallel forces their voltages to the same level, and so differences in their states of charge are equalized by one charge storage element effectively discharging into the other charge storage element, and charging it up. The switching of a charge storage element into parallel with another charge storage element, and then subsequently into parallel with a still another charge storage element, redistributes charge between all three charge storage elements. This switching can be carried out repeatedly until the three charge storage elements all have substantially the same state of charge as one another. Connecting charge storage elements together in parallel can result in a faster re-distribution of charge between the charge storage elements, compared to a known technique of using a reactive element that is charged by one charge storage element, and then discharged into another charge storage element.

Switching a charge storage element of one chain into parallel with a charge storage element of another chain means that the charge storage elements do not need to be disconnected from their respective chains, and that therefore series connected switches in between the series charge elements of a chain are not required. In other words, the charge storage elements of each chain can be permanently connected, or hardwired, to one another.

The charge storage elements of the charge storage device, all contribute to storing charge until such time as the charge is required for discharge into an external device. The charge storage elements are not simply control circuitry components, rather, each charge storage element makes a significant contribution to the total charge storage capacity of the charge storage device.

Each chain of series connected charge elements will have an end of the chain at a relatively low voltage potential and an end of the chain at a relatively high voltage potential. Each charge storage element of a chain is present at a particular level in the chain, for example the charge storage element at the end of the chain with the lowest voltage potential can be said to be at the first level in the chain, the next charge storage element connected to it can be said to be at the second level in the chain, and the next charge storage element connected to the chain storage element at the second level in the chain can be said to be at the third level in the chain, and so on. The charge storage elements that are at the same level as one another but in different chains are said to form a slice of the charge storage device.

Advantageously, during a first period of time a first charge storage element of a first chain may be connected into parallel with another charge storage element at the same level in a second chain, or in other words, into parallel with another charge storage element of the same slice. During a second period of time, the first charge storage element may be connected into parallel with a second charge storage element of the second chain, the second charge storage element being one level higher or one level lower in the second chain than the level of the first charge storage element in the first chain. It is also possible to connect the first charge storage element of the first chain into parallel with a second charge storage element of a second chain during the second time period, or during a subsequent time period, wherein the second charge storage element of the second chain is two or more levels above or below the level of the first charge storage element of the first chain.

Clearly, if the chains all have the same number of charge storage elements, and if the charge storage elements are all the same as one another, then the parallel connection of one charge storage element at a level n of a chain to another charge storage element at a level n+1 of another chain means that the absolute voltage potentials at the lower end of each chain will differ from one another by the same amount as the potential difference across one charge storage element. Advantageously, if each chain has N different levels (i.e. N different charge storage elements connected in series), then in a first time period the 1st to N charge storage elements of a first chain may be respectively connected in parallel to the 1st to N charge storage elements of a second chain, and in a second time period the 1st to N−1 charge storage elements of the first chain may be respectively connected in parallel to the 2nd to N charge storage elements of a second chain. The first and second time periods may be cyclically repeated so that charge is re-distributed amongst the charge storage elements until all the charge storage elements have a similar state of charge to one another. During the second time periods, the Nth charge storage element of the first chain and the 1st charge storage element of the second chain do not have a corresponding charge storage element at a similar voltage level in the other chain to which they can be connected in parallel.

If the chains all have the same number of charge storage elements, and if the charge storage elements are all the same as one another, then the parallel connection of a charge storage element at a level n of a chain to another charge storage element at a level n+2 of another chain means that the absolute voltage potentials at the lower end of each chain will differ from one another by the same amount as the potential difference across two charge storage elements. Then, the Nth and N−1th charge storage elements of the first chain and the 1st and 2nd charge storage elements of the second chain do not have a corresponding charge storage element at a similar voltage level in the other chain to which they can be connected in parallel. The more disparity there is between the levels of the charge storage elements that are connected in parallel, the more potential difference there will be between the ends of the chains, and the more charge storage elements will not have a corresponding charge storage element to which they can be connected in parallel, slowing the charge balancing process. It is therefore advantageous to connect charge storage elements in parallel with other charge storage elements that are at a similar level to one another, to minimize the numbers of charge storage elements which do not have a corresponding charge storage element at a similar voltage potential in another chain to which they can be connected in parallel.

The charge storage device may comprise more than two chains of charge storage elements, for example three chains of charge storage elements.

Even further numbers of chains and further switching combinations to sequentially connect a given charge storage element of one chain into parallel with multiple (at least two) charge storage elements of other chains may be easily envisaged by those skilled in the art.

For simplicity, to allow for the potential differences that occur between the ends of the chains whilst charge balancing, the charge balancing preferably takes place between chains that are not in the process of being charged or discharged. However, if the specific application means that the charge storage device is almost always being charged or discharged, then output switching circuitry can be employed to selectively connect various chains to the output in synchronism with the switching of the charge balancing circuit. For example, if a charged storage device has four chains, then the first two chains can be switched for charging/discharging, whilst the second two chains are switched into a charge balancing sequence. Once charging/discharging is complete, the first two chains can be switched into a charge balancing sequence, and the second two chains can be switched for charging/discharging.

The charge balancing method described herein is most effective when the charge storage elements are all the same as one another. Same obviously means substantially the same, since there will always be minor differences due to manufacturing tolerances etc. The elements in one chain should be equal to one another to maximise the amount of energy that can be stored in that chain. If two chains of elements with different charge storage capacities are used, then the charge balancing method will still work. However, the charge storage elements should have the same nominal voltages in the fully charged or fully discharged states, otherwise some of the capacity of the charge storage device will not be used.

Embodiments of the invention will be apparent from and further elucidated by the following figures and examples, which are not intended to limit the scope of the invention. The person skilled in the art will understand that various embodiments may be combined.

FIG. 1b illustrates the switching phases of the system of FIG. 1a;

FIG. 2b illustrates the switching phases of the system of FIG. 2a;

FIG. 3b illustrates the switching phases of the system of FIG. 3a;

Same or similar reference signs correspond to same or similar features.

Figure 1A:
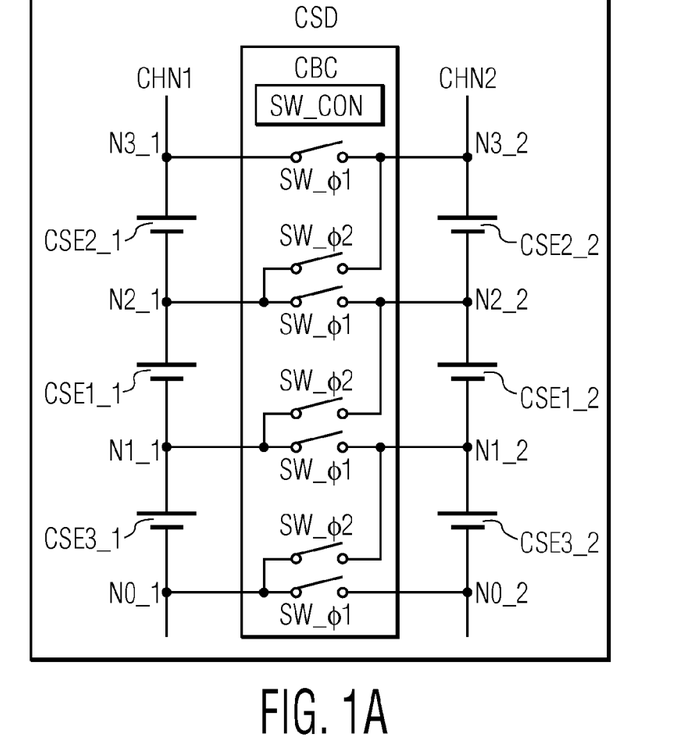
FIG. 1a shows a diagram of a system incorporating a charge balancing circuit and a charge storage device according to a first embodiment of the invention.

FIG. 1a shows a diagram of a system incorporating a charge balancing circuit CBC and a charge storage device CSD according to a first embodiment of the invention. The charge storage device CSD has first and second chains of series connected charge storage elements, CHN1 and CHN2. A first charge storage element of the first chain CHN1 is labeled CSE1_1, a first charge storage element of the second chain CHN2 is labeled CSE1_2, and a second charge storage element of the second chain CHN2 is labeled CSE2_2.

Each chain is made up of three charge storage elements with nodes between them, the first chain CHN1 having nodes N0_1, N1_1, N2_1, N3_1, and the second chain having nodes N0_2, N1_2, N2_2, N3_2. The first chain CHN1 is said to have three levels corresponding to the three charge storage elements, wherein node N1_1 is at the first level, node N2_1 is at the second level, and node N3_1 is at the third level. The first chain CHN2 is also said to have three levels corresponding to the three charge storage elements, wherein node N1_2 is at the first level, node N2_2 is at the second level, and node N3_2 is at the third level.

The nodes are connected to the charge balancing circuit CBC, which has switches SW_ϕ1 and SW_ϕ2 that are controlled by corresponding switch control circuitry SW_CON. The connections between the switch control circuitry SW_CON and the switches SW_ϕ1 and SW_ϕ2 are not shown for clarity. Note that the charge storage elements of each chain do not have any series switches between them. They are directly hardwired to one another at the nodes N0_1, N1_1, N2_1, N3_1 for the first chain CHN1, and at the nodes N0_2, N1_2, N2_2, N3_2, for the second chain CHN2.

During charging and/or discharging of the charge storage device CSD, the charge balancing circuit CBC connects the nodes at the same levels of the chains together by closing the switches SW_ϕ1 and opening the switches SW_ϕ2. This connects the charge storage elements at the same levels in the chains together in parallel. For example, charge storage element CSE1_1 at the second level of the first chain CHN1 is connected into parallel with charge storage element CSE1_2 at the second level of the second chain CHN2. The nodes N0_1 and N0_2 form the negative output of the charge storage device CSD, and the nodes N3_1 and N3_2 form the positive output of the charge storage device. These positive and negative outputs may be connected to a load for discharging, or to a charger for charging.

During charge balancing, the switches SW_ϕ1 are all closed and the switches SW_ϕ2 are all opened for a first period of time ϕ1, and the switches SW_ϕ2 are all closed and the switches SW_ϕ1 are all opened for a second period of time ϕ2. This connects charge storage elements at the same levels in the chains together in parallel during the first period of time, and charge storage elements at different levels in the chains together in parallel during the second period of time. This allows excess charge in one of the charge storage elements to be re-distributed to the other charge storage elements, and the more times the first and second time periods are repeated, the more equally the excess charge will be distributed across the charge storage elements.

For example, during the first period of time, the switches SW_ϕ1 connect the first charge storage element CSE1_1 of the first chain CHN1 in parallel with the first charge storage element CSE1_2 of the second chain CHN2. Any voltage differences due to imbalances in the state of charge of CSE1_1 and CSE1_2 will cause currents to flow through the switches SW_ϕ1 that are between nodes N1_1, N1_2, and between nodes N2_1, N2_2. These currents will allow any charge imbalances between the charge storage elements CSE1_1 and CSE1_2 to equalise. During the second period of time, the switches SW_ϕ2 connect the first charge storage element CSE1_1 of the first chain CHN1 in parallel with the second charge storage element CSE2_2 of the second chain CHN2. Any voltage differences due to imbalances in the state of charge of CSE1_1 and CSE2_2 will cause currents to flow through the switches SW_ϕ2 that are between nodes N1_1, N2_2, and between nodes N2_1, N3_2. These currents will allow any charge imbalances between the charge storage elements CSE1_1 and CSE2_2 to equalise. Further first and second time periods will result in further equalisation of excess charge amongst the other charge storage elements of the charge storage device.

Looking at the charge re-distribution, imagine that at the start of the first period of time, all charge storage elements have a charge of Q, except for the charge storage element CSE1_2, which has an excess charge of Q+E. Assuming ideal switches and charge storage elements, at the end of the first time period, all charge storage elements have a charge of Q, except for the charge storage elements CSE1_1 and CSE1_2, which have an excess charge of Q+E/2. This is due to the connection of CSE1_1 and CSE1_2 in parallel and the re-distribution of charge from CSE1_2 to CSE1_1. At the end of the second time period, all charge storage elements have a charge of Q, except for the charge storage elements CSE1_1, CSE2_2, CSE3_1, CSE1_2 which all have an excess charge of Q+E/4. This is due to the connection of CSE1_1 and CSE2_2 in parallel and the re-distribution of charge from CSE1_1 to CSE2_2, and due to the connection of CSE3_1 and CSE1_2 in parallel and the re-distribution of charge from CSE1_2 to CSE3_1. A further first time period will result in CSE1_1 and CSE1_2 having a charge of Q+E/4 (no change), in CSE2_1 and CSE2_2 having a charge of Q+E/8 (re-distribution of charge from CSE2_2 to CSE2_1), and in CSE3_1 and CSE3_2 also having a charge of Q+E/8 (re-distribution of charge from CSE3_1 to CSE3_2). A further second time period will result in further charge re-distribution, and the first and second time periods can be repeated cyclically until the excess charge is sufficiently equally distributed amongst all of the charge storage devices.

Figure 1B:
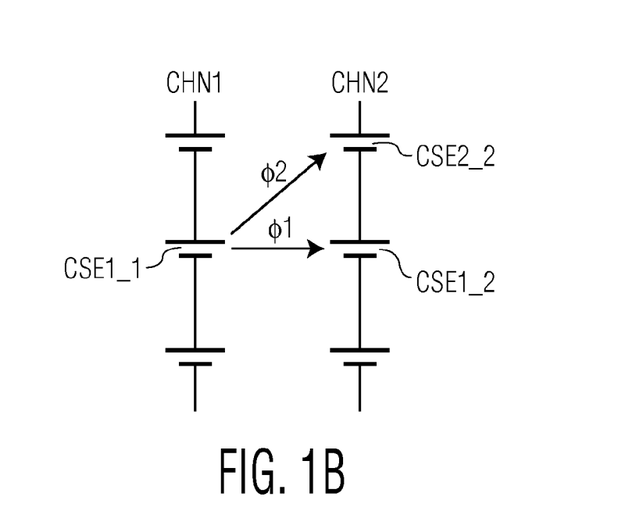

FIG. 1b shows that the charge storage element CSE1_1 is connected in parallel with the charge storage element CSE1_2 during the first period of time ϕ1, and in parallel with CSE2_2 during the second period of time ϕ2. This leads to charge re-distribution between the charge storage elements CSE1_1, CSE1_2, and CSE1_1. Obviously, there are many other switching arrangements besides the one shown in FIG. 1a that could be used to implement the switching phases shown in FIG. 1b.

Clearly, each chain of the charge storage device requires at least two charge storage elements, and may have many more than just three charge storage elements.

Since the switches SW_ϕ1 and SW_ϕ2 are connected between nodes that are at similar voltage potentials, the current flows are typically small, and so the switches do not need to be able to handle high currents. Advantageously, the switches may be MOSFETS so that their resistance can be controlled to control the level of current that flows between the charge storage elements, to avoid overheating or use of cooling devices.

The duration of each switching time period depends on the actual application. The longer the time periods, the less switching losses that occur. But, the time periods should not be so long as to unnecessarily extend the time required to balance the charge storage device. A practical value that will suit most battery cell charge storage elements is 1 second, however, the designer of an application has to freedom to select any value. The value depends on the internal resistances of the charge storage elements and of the connections between them; obviously if the resistances are low, then less time will be required to transfer charge from one charge storage element to another.

In this embodiment, the charge storage device is a battery, and the charge storage elements are battery cells, although other types of charge storage elements such as super capacitors could also be used.

Figure 2A:
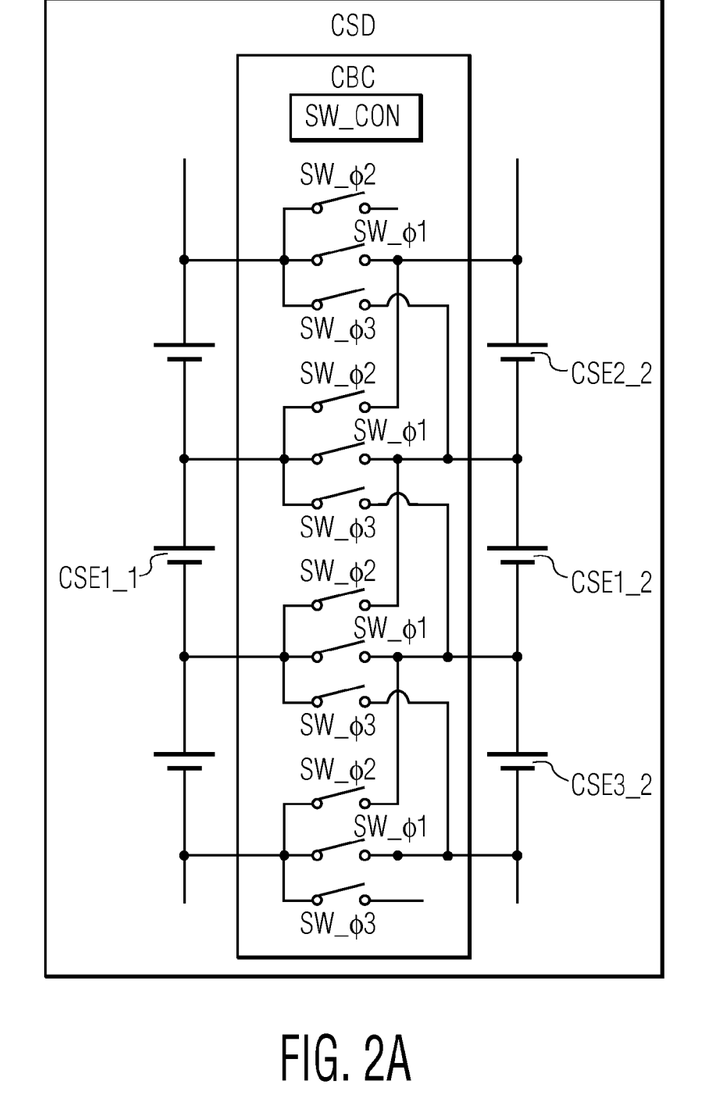
FIG. 2a shows a diagram of a system incorporating a charge balancing circuit and a charge storage device according to a second embodiment of the invention.
Figure 2B:
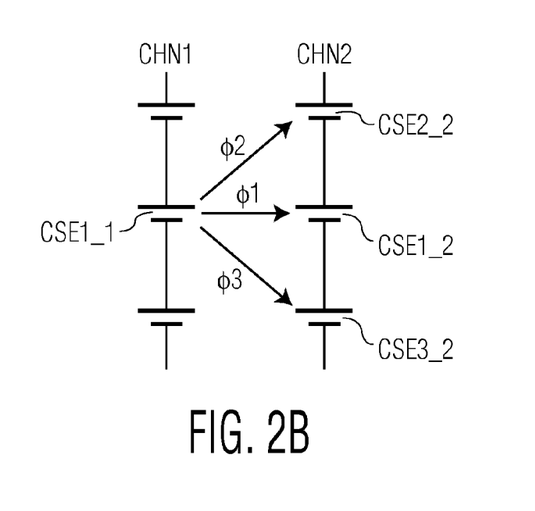

FIG. 2a shows a diagram of a system incorporating a charge balancing circuit CBC and charge storage device CSD according to a second embodiment of the invention. Compared to the first embodiment, the charge balancing circuit CBC of the second embodiment comprises additional switches SW_φ3 that are controlled by switch control circuitry SW_CON. As can be seen from FIG. 2b, the additional switches SW_φ3 are closed during a third period of time to connect a charge storage element CSE1_1 in the first chain CHN1 to a third charge storage element CSE3_1 of the second chain CHN2. The additional switches SW_φ3 may increase the cost of the charge balancing circuit CBC, although they act to improve the speed at which excess charge is re-distributed amongst the charge storage elements.

Figure 2C:
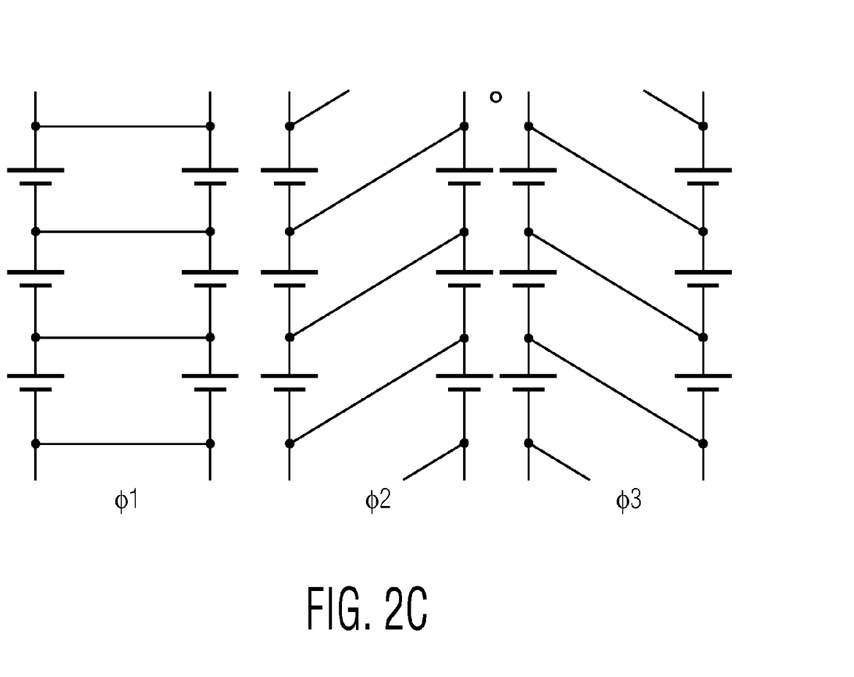
FIG. 2c illustrates one embodiment of connections in a charge balancing circuit corresponding to certain time periods.

FIG. 2c shows the connections that are made by the charge balancing circuit between the charge storage elements during the three time periods φ1, φ2, and φ3. Clearly, it is very simple the extend the lengths of the chains to incorporate more charge storage elements.

Figure 3A:
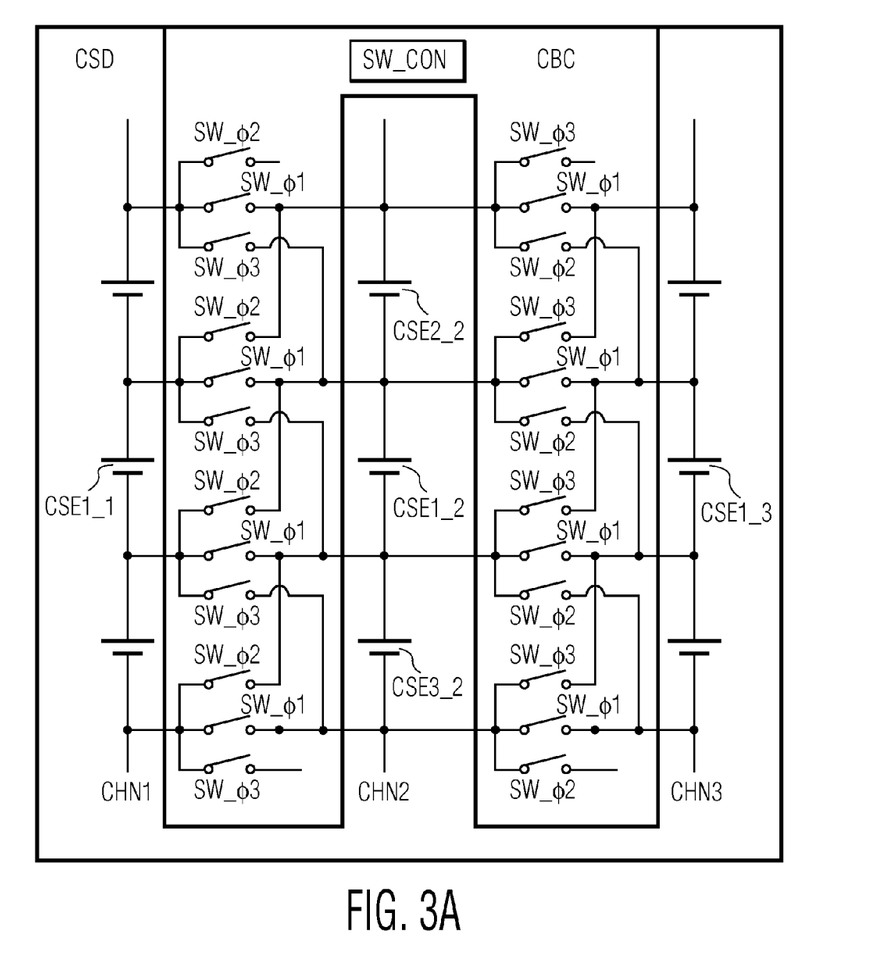
FIG. 3a shows a diagram of a system incorporating a charge balancing circuit and a charge storage device according to a third embodiment of the invention.

FIG. 3a shows a diagram of a system incorporating a charge balancing circuit CBC and a charge storage device CSD according to a third embodiment of the invention. The charge storage device CSD comprises three chains CHN1, CHN2, and CHN3 of charge storage elements, and the charge balancing circuit CBC comprises two sets of switches, one set between the nodes of chains CHN1 and CHN2, and another set between the nodes of chains CHN2 and CHN3. The positions of SW_φ2 and SW_φ3 in the set between chains CHN1 and CHN2 are reversed compared to the positions of SW_φ2 and SW_φ3 in the set between chains CHN2 and CHN3.

The switches SW_φ1, SW_φ2, and SW_φ3 are all controlled by switch control circuitry SW_CON, wherein the switches SW_φ1 are closed during a first period of time φ1 with the switches SW_φ2 and SW_φ3 open, wherein the switches SW_φ2 are closed during a second period of time φ2 with the switches SW_φ1 and SW_φ3 open, and wherein the switches SW_φ3 are closed during a third period of time φ3 with the switches SW_φ1 and SW_φ2 open.

Figure 3B:
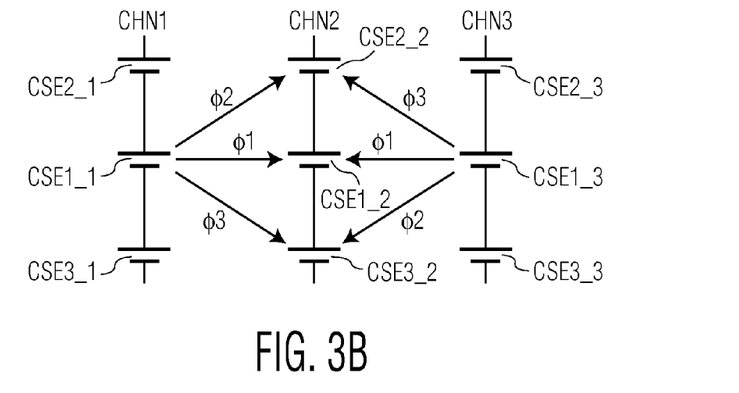

FIG. 3b shows the connections that are made by the charge balancing circuit between the charge storage elements during the three time periods φ1, φ2, and φ3. The reversal of the positions of the SW_φ2 and SW_φ3 switches between chains CHN1 and CHN2 compared to the positions of the SW_φ2 and SW_φ3 switches between chains CHN2 and CHN3, means that three charge storage elements at levels n−1, n, and n+1 are all connected together in parallel during charge balancing, speeding the re-distribution of charge amongst the charge storage elements (since excess charge can move two levels up/down the chains, rather than just one level).

Clearly, it is very simple the extend the lengths of the chains to incorporate more charge storage elements.

Figure 4:
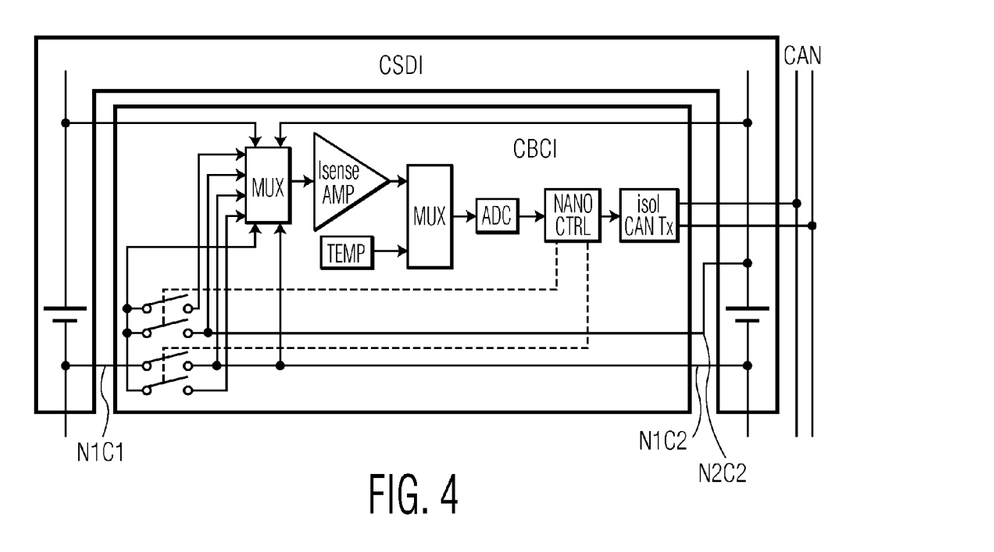
FIG. 4 shows a more detailed diagram of a charge balancing circuit suitable for use in the first embodiment of the invention.

FIG. 4 shows an example of one level CSDI of a charge storage device, together with one level CBCI of a corresponding charge balancing circuit. The node N1C1 is switchably connected to either node N1C2 or node N2C2 via the charge balancing circuit. The "mux" (multiplexer) on the left passes either the voltage of one of the battery cells, or the voltage between the battery cells, or the current through either the top switch or the bottom switch, to the amplifier. The amplifier maps the output of the left-hand mux to the input of the ADC via a second "mux". The ADC converts either the output signal of the amplifier, or the output of the temperature sensor (depending on the second "mux") into a digital word. The nanocontroller (i.e. a very simple controller) controls the position of the switches, and the data registers of the isolated CAN TRx. The isolated CAN TRx reads commands from, and sends the ADC output data to, a central controller of the charge balancing circuit. Note that this figure shows just one of many possible ways to measure and control a level of a multi-level charge storage device.

Figure 5:
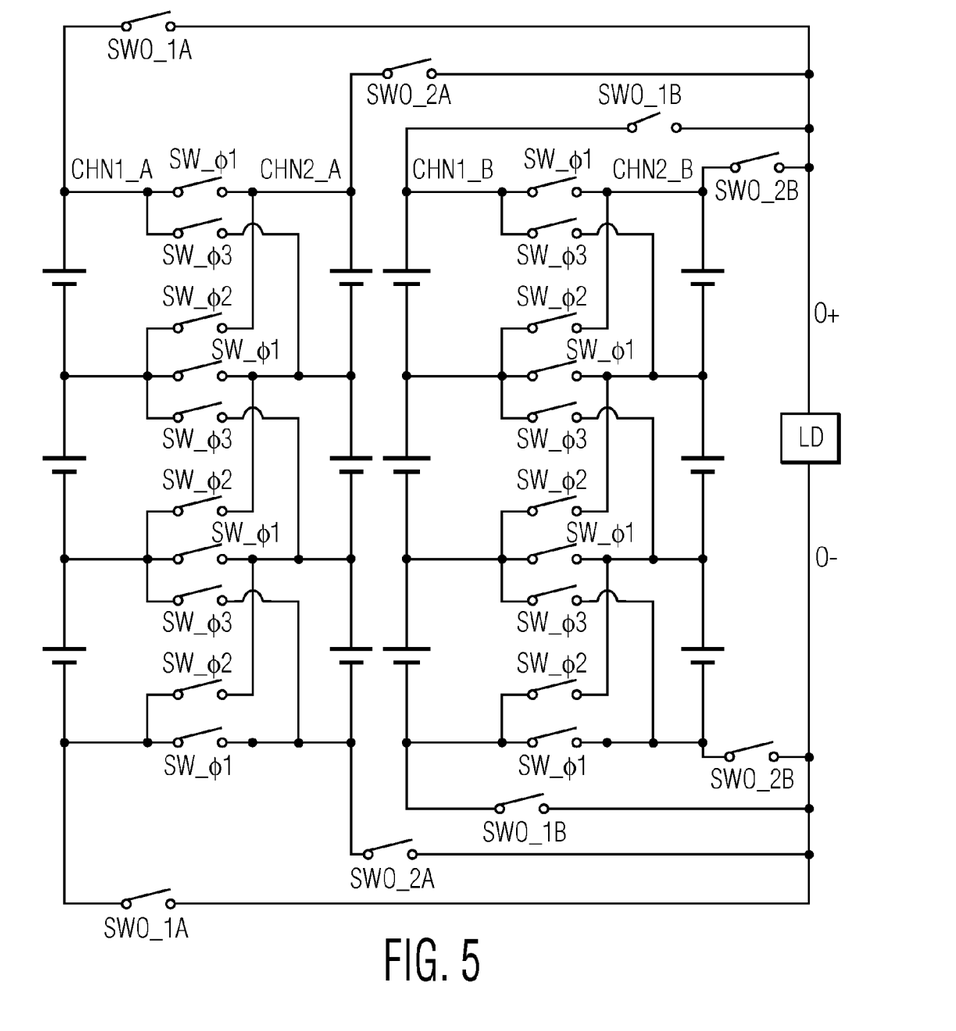
FIG. 5 shows a shows a diagram of a system incorporating a charge balancing circuit and a charge storage device according to a fourth embodiment of the invention.

FIG. 5 shows four chains CHN1_A, CHN2_A, CHN1_B, CHN2_B of charge storage elements and corresponding switching circuitry SW_φ1, SW_φ2, SW_φ3, and further shows output switching circuitry SWO_φ1A, SWO_2A, SWO_1B, and SWO_2B. The output switching circuitry is used for selectively connecting each one of the chains to output terminals O+, O− for supplying electrical power to a load LD.

This fourth embodiment uses switching of the output switches SWO_1A, SWO_2A, SWO_1B, SWO_2B to control which chains are connected to the load for supplying power, and which chains are disconnected from the load LD so that charge balancing can take place.

If no output current is required by the load LD, then all the output switches SWO_1A, SWO_2A, SWO_1B, SWO_2B can be opened, and the switches SW_φ1, SW_φ2, SW_φ3 can be closed in turn during time periods φ1, φ2, φ3, to re-distribute charge amongst the charge storage elements.

If maximum output current is required by the load LD, then all the output switches SWO_1A, SWO_2A, SWO_1B, SWO_2B can be closed, and all the switches SW_φ1 can be closed to connect all of the charge storage elements at the same levels in the chains together (SW_φ2, SW_φ3 are obviously opened to avoid short-circuits).

If a medium level of output current is required by the load LD, then the output switches SWO_1A, SWO_2A can be closed, whilst the output switches SWO_1B, SWO_2B can be opened. The switches SW_φ1 between the chains CHN1_A and CHN2_A are closed, to connect charge storage elements at the same levels in the chains CHN1_A and CHN2_A together. Then, the load LD has half the current output capability based on the chains CHN1_A and CHN2_A. Simultaneously, the switches SW_φ1, SW_φ2, SW_φ3 between the chains CHN1_B and CHN2_B can be closed in turn during time periods φ1, φ2, φ3, to re-distribute charge amongst the charge storage elements of CHN1_B and CHN2_B. Once the charge storage elements of chains CHN1_B and CHN2_B are sufficiently balanced, the output switches SWO_1A, SWO_2A can be opened, whilst the output switches SWO_1B, SWO_2B can be closed. Then, the chains CHN1_B and CHN2_B can supply the output current to the load LD, whilst charge balancing takes place on chains CHN1_A and CHN2_A.

In this example, the switching circuitry is the same as that shown in FIG. 2a, although obviously the function of the output switches SWO_1A, SWO_2A, SWO_1B, SWO_2B, is still valid for other types of switching circuitry as well. Additionally, output switching circuitry is easily applied in the same way to charge storage devices having more/less chains than the four chains described in this embodiment.

Those skilled in the art will appreciate that the charge balancing circuit may be implemented using one or more Integrated Circuits (IC), for example one IC may be used per level or per group of levels of the chains of the charge storage device.

Figure 6:
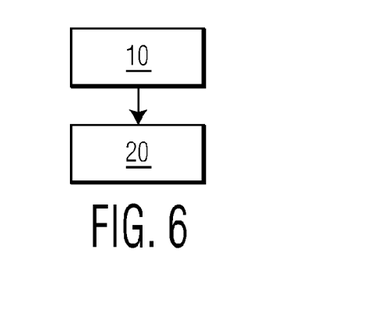
FIG. 6 shows a flow diagram of a method according to the Invention.

FIG. 6 shows a flow diagram of a method according to the Invention. In step 10, a first charge storage element of a first chain is connected in parallel with a first charge storage element of a second chain, and in step 20, a first charge storage element of the first chain is connected in parallel with a second charge storage element of the second chain.

In summary, there is provided a charge balancing circuit and method, in which different charge storage elements of a charge storage device are sequentially connected together in parallel, to re-distribute charge amongst the charge storage elements.

The invention claimed is:

1. A method for balancing charge storage elements of a charge storage device, the charge storage device comprising at least two series connected chains of charge storage elements, the method comprising:
   (a) connecting a first charge storage element of a first chain in parallel with a first charge storage element of a second chain during a first period of time by closing at least a first switch from the plurality of switches that connects a first node of the first charge storage element of the first chain to a node of the first charge storage element of the second chain for a duration;
   (b) connecting the first charge storage element of the first chain in parallel with a second charge storage element of the second chain during a second period of time by closing at least a second switch from the plurality of switches that connects the first node of the first charge storage element of the first chain to a node of the second charge storage element of the second chain, the node of the second charge storage element in the second chain different than the node of the first charge storage element in the second chain; and
   (c) connecting the first charge storage element of the first chain in parallel with a third charge storage element of the second chain during a third period of time via at least a third switch from the plurality of switches that connects the first node of the first charge storage element of the first chain to a node of the third charge storage element of the second chain, the node of the third charge storage element in the second chain different than the nodes of the first and second charge storage elements in the second chain, wherein at least one node of the second chain is directly connected to three distinct nodes of the first chain via three respective switches of the plurality of switches during the first period of time, the second period of time and the third period of time respectively.

2. The method of claim 1, wherein the duration is based on internal resistances of the charge storage elements and connections among the charge storage elements.

3. The method of claim 1, further comprising connecting:
   the first charge storage element of the second chain in parallel with a first charge storage element of a third chain during the first period of time;
   the third charge storage element of the second chain in parallel with the first charge storage element of the third chain during the second period of time; and
   the second charge storage element of the second chain in parallel with the first charge storage element of the third chain during the third period of time.

4. The method of claim 1 further comprising connecting:
   the first charge storage element of the second chain in parallel with a second charge storage element of the first chain during the second period of time by closing at least a fourth switch from the plurality of switches that connects the node of the first charge storage element of the second chain to a node of the second charge storage element of the first chain, the node of the second charge storage element in the first chain different from the first node of the first charge storage element in the first chain; and
   the first charge storage element of the second chain in parallel with a third charge storage element of the first chain during the third period of time by closing at least a fifth switch from the plurality of switches that connects the node of the first charge storage element of the second chain to a node of the third charge storage element of the first chain, the node of the third charge storage element in the first chain different from the first node of the first charge storage element in the first chain and the node of the second charge storage element in the first chain.

5. The method of claim 1, wherein at least one node of the first chain is connected to three distinct nodes of the second chain via three respective switches of the plurality of switches during the first period of time, the second period of time and the third period of time respectively.

6. A charge balancing circuit for balancing a plurality of charge storage elements of a charge storage device, the charge storage device comprising at least two series connected chains of charge storage elements, wherein the charge balancing circuit comprises a plurality of switches and corresponding switch control circuitry arranged to connect:
   (a) a first charge storage element of a first chain in parallel with a first charge storage element of a second said chain during a first period of time for a duration via at least a first switch from the plurality of switches that connects a first node of the first charge storage element of the first chain to a node of the first charge storage element of the second chain;
   (b) the first charge storage element of the first chain in parallel with a second charge storage element of the second chain during a second period of time via at least a second switch from the plurality of switches that connects the first node of the first charge storage element of the first chain to a node of the second charge storage element of the second chain, the node of the second charge storage element in the second chain different from the node of the first charge storage element in the second chain; and
   (c) the first charge storage element of the first chain in parallel with a third charge storage element of the second chain during a third period of time via at least a third switch from the plurality of switches that connects the first node of the first charge storage element of the first chain to a node of the third charge storage element of the second chain, the node of the third charge storage element in the second chain different from the nodes of the first and second charge storage elements in the second chain, wherein at least one node of the second chain is directly connected to three distinct nodes of the first chain via three respective switches of the plurality of switches during the first period of time, the second period of time and the third period of time respectively.

7. The charge balancing circuit of claim 6, wherein the plurality of switches connect nodes between the first and second chains, and wherein the at least the first switch that is closed during the first period of time is opened during the second and third periods of time, and wherein the at least the second switch that is closed during the second period of time is opened during the first and third periods of time, and wherein the at least the third switch that is closed during the third period of time is opened during the first and second periods of times.

8. The charge balancing circuit of claim 6, wherein the plurality of switches and the corresponding switch control circuitry further arranged to connect:
   the first charge storage element of the second chain in parallel with a first charge storage element of a third chain during the first period of time;
   the third charge storage element of the second chain in parallel with the first charge storage element of the third chain during the second period of time; and the second charge storage element of the second chain in parallel with the first charge storage element of the third chain during the third period of time.

9. The charge balancing circuit of claim 8, wherein the first charge storage elements of the chains are comprised at a level n of the chains, the second charge storage elements of the chains are comprised at a level n+1 of the chains, and the third charge storage elements of the chains are comprised at a level n−1 of the chains.

10. The charge balancing circuit of claim 6, wherein the charge balancing circuit further comprises output switching circuitry for selectively connecting the chains to an output for supplying electrical power to a load.

11. The charge balancing circuit of claim 6, wherein the charge storage elements are all the same as one another.

12. The charge balancing circuit of claim 6, wherein the duration is based on internal resistances of the plurality of charge storage elements and connections among the plurality of charge storage elements.

13. The charge balancing circuit of claim 6, wherein the plurality of switches and the corresponding switch control circuitry are further arranged to connect:
the first charge storage element of the second chain in parallel with a second charge storage element of the first chain during the second period of time via at least a fourth switch from the plurality of switches that connects the node of the first charge storage element of the second chain to a node of the second charge storage element of the first chain, the node of the second charge storage element in the first chain different from the first node of the first charge storage element in the first chain; and
the first charge storage element of the second chain in parallel with a third charge storage element of the first chain during the third period of time via at least a fifth switch from the plurality of switches that connects the node of the first charge storage element of the second chain to a node of the third charge storage element of the first chain, the node of the third charge storage element in the first chain different from the first node of the first charge storage element in the first chain and the node of the second charge storage element in the first chain.

14. The charge balancing circuit of claim 6, wherein at least one node of the first chain is connected to three distinct nodes of the second chain via three respective switches of the plurality of switches during the first period of time, the second period of time and the third period of time respectively.

15. A charge storage device, comprising at least two series connected chains of charge storage elements, wherein the charge storage device comprises nodes at the series connections between the charge storage elements of each chain, the nodes for connection to a charge balancing circuit for balancing the charge storage elements of the charge storage device, wherein the charge balancing circuit comprises a plurality of switches and corresponding switch control circuitry arranged to connect:
(a) a first charge storage element of a first said chain in parallel with a first said charge storage element of a second said chain during a first period of time for a duration via at least a first switch from the plurality of switches that connects a first node of the first charge storage element of the first chain to a node of the first charge storage element of the second chain;
(b) the first charge storage element of the first chain in parallel with a second charge storage element of the second chain during a second period of time via at least a second switch from the plurality of switches that connects the first node of the first charge storage element of the first chain to a node of the second charge storage element of the second chain, the node of the second charge storage element in the second chain different from the node of the first charge storage element in the second chain; and
(c) the first charge storage element of the first chain in parallel with a third charge storage element of the second chain during a third period of time via at least a third switch from the plurality of switches that connects the first node of the first charge storage element of the first chain to a node of the third charge storage element of the second chain, the node of the third charge storage element in the second chain different from the nodes of the first and second charge storage elements in the second chain, wherein at least one node of the second chain is directly connected to three distinct nodes of the first chain via three respective switches of the plurality of switches during the first period of time, the second period of time and the third period of time respectively.

16. The charge storage device of claim 15, wherein the plurality of switches connect nodes between the first and second chains, and wherein the at least the first switch that is closed during the first period of time is opened during the second and third periods of time, and wherein the at least the second switch that is closed during the second period of time is opened during the first and third periods of time, and wherein the at least the third switch that is closed during the third period of time is opened during the first and second periods of times.

17. The charge storage device of claim 15, wherein the switch control circuitry is configured to sequentially connect the different charge storage elements of the charge storage device together in parallel for a duration, wherein the duration is based on internal resistances of the charge storage elements and connections among the charge storage elements.

18. The charge storage device of claim 15, wherein the plurality of switches and the corresponding switch control circuitry are further arranged to connect:
the first charge storage element of the second chain in parallel with a second charge storage element of the first chain during the second period of time via at least a fourth switch from the plurality of switches that connects the node of the first charge storage element of the second chain to a node of the second charge storage element of the first chain, the node of the second charge storage element in the first chain different from the first node of the first charge storage element in the first chain; and
the first charge storage element of the second chain in parallel with a third charge storage element of the first chain during the third period of time via at least a sixth switch from the plurality of switches that connects the node of the first charge storage element of the second chain to a node of the third charge storage element of the first chain, the node of the third charge storage element in the first chain different from the first node of the first charge storage element in the first chain and the node of the second charge storage element in the first chain.

19. The charge storage device of claim 15, wherein at least one node of the first chain is connected to three distinct nodes of the second chain via three respective switches of the plurality of switches during the first period of time, the second period of time and the third period of time respectively.

* * * * *